United States Patent
Watson

(10) Patent No.: US 11,770,565 B2
(45) Date of Patent: *Sep. 26, 2023

(54) GLOBAL APPROACH TO BUFFERING MEDIA CONTENT

(71) Applicant: NETFLIX, INC., Los Gatos, CA (US)

(72) Inventor: Mark Watson, San Francisco, CA (US)

(73) Assignee: NETFLIX, INC., Los Gatos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,950

(22) Filed: Sep. 3, 2021

(65) Prior Publication Data

US 2021/0400318 A1    Dec. 23, 2021

Related U.S. Application Data

(63) Continuation of application No. 16/716,405, filed on Dec. 16, 2019, now Pat. No. 11,115,688.

(51) Int. Cl.
*H04N 21/234* (2011.01)
*H04N 21/231* (2011.01)
(Continued)

(52) U.S. Cl.
CPC ..... *H04N 21/23406* (2013.01); *H04N 21/231* (2013.01); *H04N 21/2387* (2013.01); *H04N 21/24* (2013.01)

(58) Field of Classification Search
CPC ........... H04N 21/23406; H04N 21/231; H04N 21/2387; H04N 21/24
See application file for complete search history.

(56) References Cited

U.S. PATENT DOCUMENTS 10,028,011 B2 * 7/2018 Yao .................... H04N 21/4331
2006/0161959 A1 7/2006 Ryman et al.
(Continued)

FOREIGN PATENT DOCUMENTS

EP    3 133 602 A1    2/2017
WO    2012/037129 A2    3/2012

OTHER PUBLICATIONS

International Search Report for application No. PCT/US2020/064494 dated Mar. 15, 2021.
(Continued)

*Primary Examiner* — Sumaiya A Chowdhury
(74) *Attorney, Agent, or Firm* — Artegis Law Group, LLP

(57) ABSTRACT

In various embodiments, a graph streaming application computes a first distance along a first potential playback path between a first playback position and a first media content block. The graph streaming application then computes a first score for the first media content block based on the first distance and a first probability associated with the first potential playback path. Similarly, the graph streaming application computes a second score for a second media content block based on a second playback position, a second potential playback path, and a second probability associated with the second potential playback path. The graph streaming application compares the first score and the second score to determine that the first media content block should be buffered by a client device. The graph streaming application then causes the first media content block to be stored in a playback buffer for subsequent playback on the client device.

35 Claims, 4 Drawing Sheets

(51) Int. Cl.
H04N 21/2387 (2011.01)
H04N 21/24 (2011.01)

(56) References Cited

U.S. PATENT DOCUMENTS

| | | | |
|---|---|---|---|
| 2008/0104121 A1 | 5/2008 | Gottlieb et al. | |
| 2008/0310814 A1 | 12/2008 | Bowra et al. | |
| 2009/0292819 A1 | 11/2009 | Kandekar et al. | |
| 2014/0029914 A1* | 1/2014 | Deglise | H04N 21/8455 386/241 |
| 2014/0189735 A1* | 7/2014 | Cudak | H04N 21/8456 725/38 |
| 2015/0143239 A1 | 5/2015 | Birkbeck et al. | |
| 2015/0294685 A1* | 10/2015 | Bloch | G11B 27/034 386/278 |
| 2016/0142510 A1 | 5/2016 | Westphal et al. | |
| 2017/0034233 A1 | 2/2017 | Funge et al. | |
| 2020/0037047 A1* | 1/2020 | Cheung | H04N 21/8541 |

OTHER PUBLICATIONS

Rishnamoorthi et al., "Quality-adaptive Prefetching for Interactive Branched Video using HTTP based Adaptive Streaming", Multimedia, ACM, XP058058715, DOI: 10.1145/2647868.2654951, ISBN: 978-1-4503-3063-3, Nov. 3-7, 2014, pp. 317-326.

* cited by examiner

GLOBAL APPROACH TO BUFFERING MEDIA CONTENT

CROSS-REFERENCE TO RELATED APPLICATIONS

This application is a continuation of the co-pending U.S. patent application titled, "GLOBAL APPROACH TO BUFFERING MEDIA CONTENT," filed on Dec. 16, 2019 and having Ser. No. 16/716,405. The subject matter of this related application is hereby incorporated herein by reference.

BACKGROUND

Field of the Various Embodiments

Embodiments relate generally to computer science and streaming media technology and, more specifically, to a global approach to buffering media content.

DESCRIPTION OF THE RELATED ART

A typical media streaming service provides access to a library of media content items that can be viewed on a range of different client devices. To stream a requested media content item to a particular client device, the media streaming service sequentially transmits discrete portions of the requested media content item (referred to herein as "blocks") over one or more connections to the client device. In some implementations, to reduce the likelihood of a temporary degradation or interruption in a given connection causing a playback interruption, a playback application executing on the client device buffers multiple blocks prior to playback. More precisely, when the client device receives a given block, the playback application stores the block in a playback buffer. The playback application waits until several blocks are stored in the playback buffer before initiating the playback of the requested media content item. In this fashion, the stored blocks used for playback create a reserve, which helps prevent instances of buffer underrun.

One drawback of buffering blocks of media content, as described above, is that there can be a noticeable delay between the point in time when the viewer requests playback of a particular media content item and the point in time when playback of the requested media content item actually begins. Further, if the viewer navigates within the requested media content item or requests a different media content item, then playback is interrupted and delayed while the playback application rebuilds the reserve of blocks stored in the playback buffer. For example, if a viewer were to request an episode of a television show, then the viewer could experience a six second delay while the playback application buffers the first few blocks of the introduction of the episode. Subsequently, if the viewer were to decide to skip the remainder of the introduction, then the viewer could experience a six second playback interruption while the playback application buffers the first few blocks of the main portion of the episode. In general, these types of playback delays and playback interruptions are referred to as "re-buffering events" and can substantially degrade the overall quality of the viewer experience.

One approach for reducing re-buffering events is to use a pre-fetching application along with a primary streaming application to stream media content. The primary streaming application transmits, for buffering, the blocks of the requested media content item in the order needed and preferably before the blocks are needed. For example, if the requested media content item allows a viewer to select between two different branches of a story, then a primary streaming application could transmit blocks along both branches to ensure that the proper block was available when needed. By contrast, the pre-fetching application transmits, for buffering, blocks of other media content item(s) that are most likely to be played back next. For example, if the primary streaming application were transmitting blocks of a trailer that showcases different movies, then the pre-fetching application could transmit blocks of the showcased movie that the viewer is most likely to request next.

One drawback of implementing a pre-fetching application along with a primary streaming application to reduce re-buffering events is that both applications have to be developed and optimized for each "streaming use case." A streaming use case specifies the different orders in which the blocks of a given media content item can be played back and also may be associated with information that can be used to better predict which media content item(s) are likely to be requested next by a viewer. Reliably estimating the order in which the blocks of a requested media content item are going to be needed by a client device for playback requires that the primary streaming application implement streaming algorithm logic that matches the specific streaming use case associated with the streaming session. Similarly, reliably predicting the order in which blocks of some other media content item are going to be needed by a client device for playback requires the pre-fetching application to implement a pre-fetching algorithm logic that matches the specific streaming use case associated with the streaming session. If the algorithm logic of the applications does not match the specific streaming use case, then the applications could request incorrect blocks (relative to what is needed for playback) of the various media content items for buffering. Accordingly, to properly buffer media content and reduce re-buffering events across a given streaming session, a specific primary streaming application and a specific pre-fetching application should be developed and implemented to account for each potential streaming use case that could be encountered during the streaming session.

However, because there are numerous potential streaming use cases, developing and implementing a specific streaming application and a specific pre-fetching application for each potential streaming use case is impractical. Consequently, media streaming services usually implement primary streaming applications coupled with pre-fetching applications for only a few streaming use cases. For the remaining streaming use cases, and there can be many, a more generic primary streaming application is implemented, and the reduction in re-buffering events is, consequently, sub-par. Even for the streaming use cases where both a primary streaming application and a pre-fetching application are implemented, because these applications execute independently, the order in which blocks are buffered is not necessarily properly optimized across different media content items. Accordingly, the reduction in re-buffering events can still be sub-optimal.

As the foregoing illustrates, what is needed in the art are more effective techniques for streaming media content to client devices.

SUMMARY

One embodiment sets forth a computer-implemented method for streaming media content to a client device. The method includes computing a first distance along a first potential playback path between a first playback position and a first media content block; computing a first score for the first media content block based on the first distance and a first probability that the first potential playback path is to be followed during a playback session associated with the client device; computing a second distance along a second potential playback path between a second playback position and a second media content block; computing a second score for the second media content block based on the second distance and a second probability that the second potential playback path is to be followed during the playback session; comparing the first score to the second score to determine that the first media content block should be buffered by the client device; and causing the first media content block to be stored in a playback buffer for subsequent playback on the client device.

At least one technical advantage of the disclosed techniques relative to the prior art is that, with the disclosed techniques, one software application can be implemented to preemptively transmit media content blocks when streaming media content items to a client device across multiple different streaming use cases. In that regard, because the disclosed techniques implement a single algorithm that performs both streaming and pre-fetching across a wide variety of streaming use cases, the time and effort required to enable effective buffering for each streaming use case is substantially reduced. In addition, unlike prior art techniques, the disclosed techniques account for the different potential playback paths across multiple media content items and multiple streaming use cases when selecting blocks for buffering. As a result, the disclosed techniques can increase the likelihood that a sufficient number of blocks of media content are properly buffered by a client device before playback, thereby reducing the likelihood of re-buffering events. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
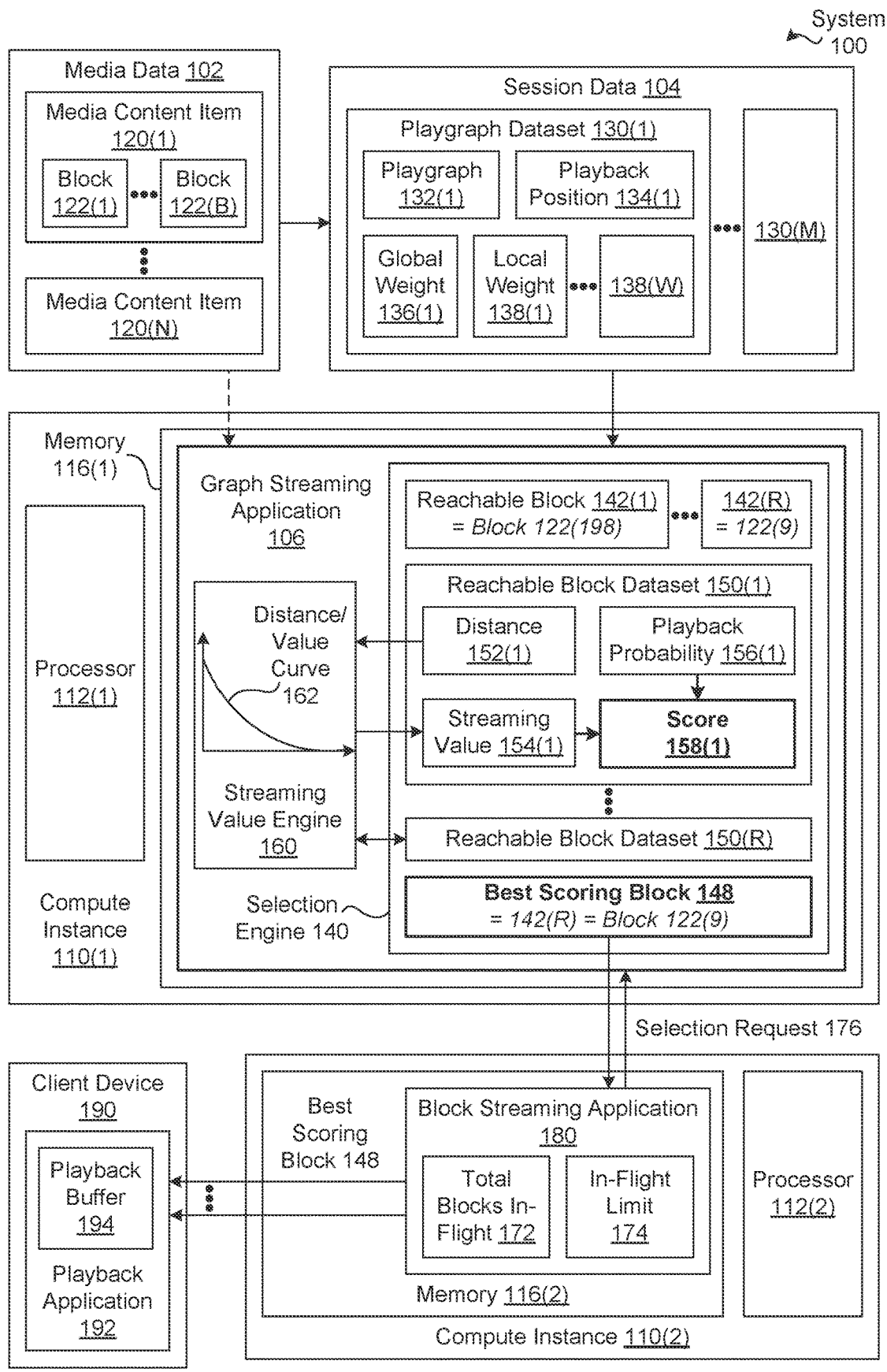
FIG. 1 is a conceptual illustration of a system configured to implement one or more aspects of the various embodiments.

In the following description, numerous specific details are set forth to provide a more thorough understanding of the various embodiments. However, it will be apparent to one skilled in the art that the inventive concepts may be practiced without one or more of these specific details.

During a typical streaming session, a media streaming service transmits blocks of media content items over one or more connections to a playback application executing on a client device. When the playback application receives a given block, the playback application stores the block in a playback buffer. Initially, the playback application waits until several blocks are stored in the playback buffer before initiating the playback of a requested media content item. In this fashion, the stored blocks used for playback create a reserve that reduces the likelihood of a temporary degradation or interruption in the connection(s) causing a playback disruption.

One drawback of buffering blocks of media content is that there can be a noticeable delay between the point in time when the viewer requests playback of a particular media content item and the point in time when the playback of the requested media content item actually begins. Further, if the viewer navigates within the requested media content item or requests a different media content item, then playback is interrupted and delayed while the playback application rebuilds the reserve of blocks stored in the playback buffer. In general, these types of playback delays and playback interruptions are referred to as re-buffering events. During a re-buffering event, the client device usually displays either a frozen frame or a frozen frame superimposed with an indication of the re-buffering event, such as a spinner. As is well known, re-buffering events can substantially degrade the overall quality of the viewer experience.

To reduce re-buffering events, some streaming service providers use a pre-fetching application along with a primary streaming application to stream media content. The primary streaming application transmits, for buffering, the blocks of the requested media content item in the order needed and preferably before the blocks are needed. The order in which blocks are needed and any number of options that the viewer can select are specified via a streaming use case. For example, the order of blocks in an introduction of a movie and an option to skip a portion of the introduction could be specified via a skip introduction use case. While displaying an introduction as per the skip introduction use case, the client application could superimpose a button over the displayed media content that allows the viewer to skip the remainder of the introduction. By contrast, the pre-fetching application transmits, for buffering, blocks of other media content item(s) that are most likely to be played back next. As described previously herein, to properly reduce re-buffering events across a given streaming session, a specific primary streaming application and a specific pre-fetching application should be developed and implemented to account for each potential streaming use case that could be encountered during the streaming session.

However, because there are numerous potential streaming use cases, developing and implementing a specific streaming application and a specific pre-fetching application for each potential streaming use case is impractical. Consequently, media streaming services usually implement primary streaming applications coupled with pre-fetching applications for only a few streaming use cases. For the remaining streaming use cases, a more generic primary streaming application is implemented, and the reduction in re-buffering events is, consequently, sub-par. Even for the streaming use cases where both a primary streaming application and a pre-fetching application are implemented, because these applications execute independently, the order in which blocks are buffered is not necessarily properly optimized across different media content items. Accordingly, the reduction in re-buffering events can still be sub-optimal.

With the disclosed techniques, however, a single graph streaming application determines the optimal block for streaming from the blocks included in any number of playback graphs. Each playback graph represents a different streaming use case and graphically depicts any number of different potential playback paths. Each potential playback path includes blocks from portions of any number of the media content items. For example, a default potential playback path associated with a fast post play use case could include the blocks corresponding to the main portions of two episodes of a television show and omit the blocks corresponding to credits.

Each of the playback graphs also includes parameters for the playback position, a global weight, and any number of local weights that may be varied in real-time in any technically feasible fashion. The global weight is an estimated relative likelihood of the actual playback following one of the potential playback paths in the associated playback graph. Each of the local weights is an estimated relative likelihood of a different viewer choice that selects between one or more of the potential playback paths.

At any given time, to determine the optimal block for buffering, the graph streaming application analyzes the different potential playback paths across all of the playback graphs. For the playback graph that the playback application is currently following, the graph streaming application selects the unbuffered blocks that are closest in distance to the current playback position along the various potential playback paths. For each of the remaining playback graphs, the graph streaming application selects the unbuffered blocks that are closest in distance to the beginning of the playback graph along the various potential playback paths. For each of the selected blocks, the graph streaming application computes a score based on the distance, the associated global weight, and any applicable local weights. Importantly, as the distance increases, the score decreases. By contrast, as the applicable weights increase, the score also increases. The graph streaming application then selects the highest scoring block for transmission to the playback application.

At least one technical advantage of the disclosed techniques relative to the prior art is that the graph streaming application implements a single algorithm that can perform both streaming and pre-fetching across multiple different streaming use cases. Because the process of enabling effective buffering for a given streaming use case is simplified from developing two corresponding applications to generating one corresponding playgraph, the time and effort required to reliably reduce re-buffering events for each streaming use case is substantially reduced. Accordingly, a media streaming service that has limited resources can improve buffering for more streaming use cases. Furthermore, unlike prior art techniques, the graph streaming application accounts for the different potential playback paths across any number of media content items and any number of streaming use cases when selecting blocks for buffering. Consequently, the likelihood that each block of media content is properly buffered by a client device before the block is required for display on the client device is increased. As a result, the likelihood of re-buffering events is decreased and the overall quality of the viewer experience can be increased. These technical advantages provide one or more technological advancements over prior art approaches.

System Overview

FIG. 1 is a conceptual illustration of a system 100 configured to implement one or more aspects of the various embodiments. The system 100 includes, without limitation, compute instances 110, media data 102, a client device 190, and session data 120. For explanatory purposes, multiple instances of like objects are denoted with reference numbers identifying the object and parenthetical alphanumeric characters identifying the instance where needed.

In alternate embodiments, the system 100 may include any number of compute instances 110 and any number of client devices 190 in any combination. Any number of the components of the system 100 may be distributed across multiple geographic locations or implemented in one or more cloud computing environments (i.e., encapsulated shared resources, software, data, etc.) in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit ("CPU"), a graphics processing unit ("CPU"), a controller, a micro-controller, a state machine, or any combination thereof. The memory 116 stores content, such as software applications and data, for use by the processor 112 of the compute instance 110. In alternate embodiments, each of any number of compute instances 110 may include any number of processors 112 and any number of memories 116 in any combination. In particular, any number of the compute instances 110 (including one) may provide a multiprocessing environment in any technically feasible fashion.

The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

Each of the compute instances 110 is configured to implement one or more applications or subsystems of applications. For explanatory purposes only, each application is depicted as residing in the memory 116 of a single compute instance 110 and executing on a processor 112 of the single compute instance 110. However, in alternate embodiments, the functionality of each application may be distributed across any number of other applications that reside in the memories 116 of any number of compute instances 110 and execute on the processors 112 of any number of compute instances 110 in any combination. Further, the functionality of any number of applications or subsystems may be consolidated into a single application or subsystem.

In particular, the compute instance 110(2) is configured to stream media content included in the media data 102 to the client device 190. In alternate embodiments, the compute instance 110(2) may be configured to stream the same or different media content to any number of the client devices 190. As referred to herein, a discrete portion of media content may include, without limitation, any amount (including none) of visual content and any amount (including none) of audio content in any combination. In some embodiments, the media data 102 is a media library that is provided by a media streaming service.

As shown, the media data 102 includes, without limitation, any number of media content items 120. Each media content item 120 includes, without limitation, any amount and type of media content. For example, the media content item 120(1) could be a feature-length movie, an episode of a television show, an audiovisual clip, a podcast, and so forth. The amount of media content in one media content item 120 may vary from the amount of media content in other media content items 120. Although not shown, the media content included in each media content item 120 is organized as a sequence of frames of media content, and the number of frames in one media content item 120 may vary from the number of frames in other media content items 120.

The sequence of frames included in each media content item 120 is partitioned into any number of blocks 122, where each block 122 is a different contiguous sub-sequence of the frames. The media content item 120 may be partitioned into any number of blocks 122 in any technically feasible fashion. The number of blocks 122 in one media content item 120 may vary from the number of blocks 122 in other media content items 122, and the number of frames in one block 122 may vary from the number of frames in other blocks 122. The number of frames in each block 122 correlate to the length of the block 122 in playback time. For instance, in some embodiments, the length of each of the blocks 122 varies between 0.5 seconds and ten seconds of playback time.

The client device 190 may be any device that is capable of receiving and displaying media content. Examples of client devices 190 include, without limitation, laptop computers, tablets, smartphones, game consoles, etc. As shown, the client device 190 includes, without limitation, a playback application 192. The playback application 192 resides and executes on the client device 190, and may display media content the blocks 122) using any type of display accessible to the client device 190.

The playback application 192 provides any amount and type of functionality associated with the media data 102. For instance, in some embodiments, the media data 102 and the playback application 192 are provided by a media streaming service. The playback application 192 may provide any number of interface elements (e.g., a graphical user interface ("GUI"), display elements, etc.) that allow any number of viewers that are local to the client device 190 to navigate within the media data 102. For instance, in some embodiments, the playback application 192 may provide a GUI that allows a viewer to browse the media content items 120 and request playback(s) of the media content item(s) 102.

Upon receiving a playback request, the playback application 192 generates the session data 104 and establishes a streaming session that is associated with the session data 104. The session data 104 includes, without limitation, any amount and type of data that is relevant to providing media content in response to the playback request and any related requests, such as a navigation request or follow-on playback request.

To initiate the streaming session, the playback application 192 establishes a connection with a block streaming application 180 that subsequently provides blocks 122 of media content to the playback application 192 based on the streaming data 104. The playback application 192 may establish a connection to the block streaming application 180 in any technically feasible fashion. In alternate embodiments, the playback application 192 may acquire and display any amount and type of media content on the client device 190 in any technically feasible fashion.

As shown, the playback application 192 includes, without limitation, a playback buffer 194. The playback application 192 uses the playback buffer 194 to buffer the blocks 122 that the playback application 192 receives from the block streaming application 180. As persons skilled in the art will recognize, buffering the blocks 122 reduces the likelihood that a temporary degradation or interruption in the connection to the block streaming application 180 results in a playback interruption.

During the streaming session, as the playback application 192 receives each block 122 from the block streaming application 180, the playback application 192 stores the block 122 in the playback buffer 194. Initially, the playback application 192 waits until several blocks 122 are stored in the playback buffer 194 to create a reserve of blocks 122 prior to displaying the requested media content item 120. The playback application 192 then displays the stored blocks 122 on the display device 190 in the proper order as per the session data 104. In alternate embodiments, the playback application 192 may create an initial reserve of blocks 122 in any technically feasible fashion. For instance, in some alternate embodiments, the playback application 192 waits for a specified duration of media content to be buffered (e.g., six seconds) even if the specified duration corresponds to less than a whole block.

During playback of the requested media content item 120, the playback application 192 may superimpose any number and type of display elements on the displayed media content. For instance, the playback application 192 may superimpose a button that allows the viewer to skip a portion of the media content item 120 or a menu that allows that the viewer to navigate within the media content item 120. At any given point in time, if the block 122 that is to be displayed as per the session data 104 is unavailable (e.g., not stored in the playback buffer 194), then a re-buffering event occurs.

As shown, the block streaming application 180 resides in the memory 116(2) of the compute instance 110(2), executes on the processor 122(2) of the compute instance 110(2), and includes, without limitation, a total blocks in-flight 172 and an in-flight limit 174. During the streaming session, the block streaming application 180 transmits any number of the blocks 122 of any number of the media content items 120 in any combination to the playback application 192. The total blocks in-flight 172 specifies the total number of the blocks 122 that are in-flight between the block streaming application 180 and the playback application 192. As referred to herein, if the block 122 is in-flight, then the block 122 is currently in transit to the playback application 192 but has not yet been received by the playback application 192. The in-flight limit 174 specifies a maximum number of blocks 122 that can be in-flight between the block streaming application 180 and the playback application 192. The block streaming application 180 may determine the in-flight limit 174 in any technically feasible fashion.

To efficiently stream the blocks 122 to the playback application 192, the block streaming application 180 attempts to maintain the total blocks in-flight 172 at the in-flight limit 174. For instance, in some embodiments, the block streaming application 180 implements a default in-flight limit 174 of three. The block streaming application 180 initially transmits three blocks 122 to the block streaming application 180. Subsequently, as each in-flight block 122 reaches the playback application 192, the block streaming application 180 transmits a new block 122 to the block streaming application 180. In alternate embodiments, the block streaming application 180 may determine when to stream a new block 122 to the playback application 192 in any technically feasible fashion.

As described deviously herein, a re-buffering event occurs whenever the block 122 required for display on the client device 190 is not stored in the playback buffer 194. During a re-buffering event, the client display 190 usually displays either a frozen frame or a frozen frame superimposed with an indication of the re-buffering event, such as a spinner. As is well known, re-buffering events can substantially degrade the overall quality of the viewer experience.

One conventional approach for reducing re-buffering events is to use a pre-fetching application along with a primary streaming application to stream media content. The primary streaming application transmits, for buffering, the blocks 122 of the requested media content item 120 in the order needed and preferably before the blocks 122 are needed. By contrast, the pre-fetching application transmits, for buffering, the blocks 122 of other media content item(s) 120 that are most likely to be played back next.

One drawback of this conventional approach to reducing re-buffering events is that because of resource constraints, media streaming services usually implement primary streaming applications coupled with pre-fetching applications for only a few streaming use cases. For the remaining streaming use cases, a more generic primary streaming application is implemented, and the reduction in re-buffering events is, consequently, sub-par. Even for the streaming use cases where both a primary streaming application and a pre-fetching application are implemented, because these applications execute independently, the order in which blocks are buffered is not necessarily properly optimized across different media content items 120. Accordingly, the reduction in re-buffering events can still be sub-optimal.

Globally Reducing Re-Buffering Events

To more efficiently and effectively reduce re-buffering events, the compute instance 110(1) implements a graph streaming application 106 that takes into account any number of streaming use cases and any number of media content items 120 to select the next block 122 for streaming. The graph streaming application 106 resides in the memory 116(1) and executes on the processor 112(1) of the compute instance 110(1).

For explanatory purposes only, the functionality of the graph streaming application 106 is described in the content of a streaming session, the session data 104, the media data 102, the block streaming application 180, and the playback application 192. In alternate embodiments, the graph streaming application 106 may access any amount and type of media content and any amount and type of data relevant to streaming the media content in any technically feasible fashion. In the same or other alternate embodiments, the graph streaming application 106 may be used by any number of software applications to determine a next block 122 for streaming in any technically feasible fashion.

As described previously herein, during the streaming session associated with the session data 104, the block streaming application 180 transmits one of the blocks 122 to the playback application 192 whenever the total blocks in-flight 172 is less than the in-flight limit 174. As shown, to determine which of the blocks 122 to transmit to the playback application 192, the block streaming application 180 transmits a selection request 176 to the graph streaming application 106. In some embodiments, the block streaming application 180 preemptively transmits the selection request 176 to the graph streaming application 106 immediately after initiating the transmission of one of the blocks 122 to the playback application 192.

In response to the selection request 176, the graph streaming application 106 determines a best scoring block 148 from the blocks 122 included in one of the media content items 120 based on the session data 104. Accordingly, the best scoring block 148 is one of the blocks 122 included in one of the media content items 120, and the block 122 that is also the best scoring block 148 changes over time. The graph selection application 130 then transmits the best scoring block 148 to the block streaming application 180. When the total blocks in-flight 172 is less than the in-flight limit 174, the block streaming application 180 transmits the best scoring block 148 to the playback application 192.

The session data 104 includes, without limitation, any number of playgraph datasets 130. Each of the playgraph datasets 130 includes, without limitation, a playgraph 132, a playback position 134, a global weight 136, and any number of local weights 138. The number of local weights 138 in one playgraph dataset 130 may vary from the number of local weights 138 included in the other playgraph datasets 130. As described in greater detail in conjunction with FIGS. 2 and 3, each of the playgraphs 132 is a graphical representation of a different streaming use case for the playback of any number of media content items 120. Some examples of streaming use cases, include, without limitation, a fast post play use case, a skip introduction use case, a branched narrative use case, a linear use case, an optional insert use case, a repeat use case, and a navigable list use case.

Each of the playgraphs 132(x) is associated with any number of parameter values that are specified in the playgraph dataset 130(x). The parameter values for the playgraph 132(x) include, without limitation, the playback position 134(x), the global weight 136(x) and the local weight(s) 138 included in the playgraph dataset 130(x). In alternate embodiments, the playgraph dataset 130(x) may include any number and type of additional parameter values for the playgraph 132(x). Any number of the parameter values may be varied in any technically feasible fashion and at any time (e.g., in real-time).

The session data 104 may be generated and maintained by any number of software applications in any technically feasible fashion. For instance, in some embodiments, the playback application 192 generates the session data 104 and both the playback application 192 and the graph streaming application 106 update the session data 104 in real-time. To generate the session data 104, the playback application 192 determines which of any number of available streaming use cases are relevant to the streaming session. For each identified streaming use case, the playback application 192 generates a different playgraph dataset 130 that includes the associated playgraph 132.

At any given point in time, the playback application 192 determines the block 122 to display on the client device 190 based on the playgraph 132 that the playback application 192 is currently following. The sequence of the blocks 122 that the playback application 192 actually displays on the client device 190 is referred to herein as the playback path. Each of the playgraphs 130 specifies any number of potential playback paths and, along each potential playback path, the blocks that the graph streaming engine 130 has previously selected as the best scoring block 148. Each potential playback path is a sequence of blocks 122 that may include any number of the blocks 122 included in any number of the media content items 120 in any combination. Notably, the sequence of blocks 122 in each potential playback path may include be out of order with respect to the sequential order of the blocks 122 within each of the media content items 120 and/or between media content items 120.

For example, the media content item 120(1) representing a movie could include the blocks 122(1)-122(10000), and a potential playback path could include, sequentially, the blocks 122(6)-122(20) representing a first portion of the introduction of the movie and the blocks 122(5001)-(5752) representing a main portion of the movie. In another example, the media content items 120(1) and 120(2) could represent two episodes of a television show, and a potential playback path could include, sequentially, a subset of the blocks 122 included in the media content item 120(1) and a subset of the blocks 122 included in the media content item 120(2).

If the playback application 192 is following the playback graph 132($x$), then the playgraph position 134($x$) specifies the position of the block 122 that is currently displayed on the display device 190. Otherwise, the playback position 134($x$) is equal to zero to indicate the beginning of the playback graph 132($x$). The playgraph positions 134 are updated in real-time in any technically feasible fashion. For instance, in some embodiments, when the playback application 192 displays a particular block 122 on the client device 190, the playback application 192 updates the associated playgraph position 134.

The global weight 136($x$) specifies an estimated likelihood that the playgraph application 192 follows the playback graph 132($x$) instead of one of the other playback graphs 132. Each of the local weights 138 included in the playback graph 132($x$) specifies an estimated likelihood for a different choice associated with the playback graph 132($x$), where the estimated likelihood is conditional on the playback application 192 following the playgraph 132($x$). The local weights 138 may be associated with any number and type of options in any technically feasible fashion.

For instance, in some embodiments, the playback application 192 may display a button during the first portion of an introduction to a movie that a viewer can click to skip the remainder of the introduction. The local weight 138(1) may specify an estimated likelihood that a viewer chooses to skip the remainder of the introduction, and the local weight 138(2) may specify an estimated likelihood that the viewer does not choose to skip the remainder of the introduction.

In some embodiments, any number of the global weights 136 and any number of the local weights 138 may be updated by any number and type of software applications in real-time. For instance, in some embodiments, the playback application 192 may update the local weights 138(1) associated with skipping an introduction based on whether the playback application 192 is displaying a "skip introduction" button and/or how much of the introduction the playback application 192 has already displayed on the display device 190. In the same or other embodiments, the playback application 192 may update the global weights 136 as a viewer navigates within a gallery of possible media content items, such as the media content items 120. For example, the playback application 192 could increase the global weights 136 associated with the media content items 120 displayed on a screen or relatively close to a current selection position. The playback application 192 could also decrease the global weights 136 associated with the media content items 120 relative far from the current selection position.

As shown, the graph streaming application 106 includes, without limitation, a selection engine 140 and a streaming value engine 160. After the graph streaming application 106 receives the selection request 176, the selection engine 140 acquires the up-to-date session data 104. The selection engine 140 then uses the streaming value engine 160 to determine the best scoring block 148. For explanatory purposes only, at any given time, the blocks 122 in the playgraphs 132 that the selection engine 140 has previously selected as the best scoring block 148 are also referred to herein as the "buffered blocks 122." The remaining blocks 122 are also referred to herein as the "unbuffered blocks 122."

As shown, the selection engine 140 includes, without limitation, any number of reachable blocks 142(1)-142(R), reachable datasets 144(1)-144(R), and the best scoring block 148. For each playgraph 132($x$), the selection engine 140 selects the unbuffered blocks 122 are reachable from the playback position 134($x$) along any of the potential playback paths in the playgraph 132($x$) via the buffered blocks 122. The selection engine 140 then defines the selected blocks 122 as the reachable blocks 142. For example, as shown in italics, the selection engine 140 could set the reachable block 142(1) equal to the block 122(198) and the reachable block 142(R) equal to the block 122(9).

As persons skilled in the art will recognize, each potential playback path includes at most one reachable block 122, and the other unbuffered blocks 122 along the potential playback path cannot be displayed on the client device 190 before the reachable block 122 is displayed on the client device 190. Consequently, along each potential playback path, streaming the reachable block 142 is more important for reducing re-buffering events than streaming any of the other unbuffered blocks 122.

For each of the reachable blocks 142($y$), the selection engine 140 generates the reachable dataset 146($y$) that includes, without limitation, a distance 152($y$), a streaming value 154($y$), a playback probability 156($y$), and a score 158($y$). For each of the playgraphs 132($x$), the selection engine 140 computes the playback probabilities 156 for the associated reachable blocks 142 based on the global weight 136($x$) and the local weights 138 included in the playgraph 132($x$). More specifically, for the reachable block 142($y$) included in the playgraph 132($x$), the selection engine 140 sets the playback probability 156($y$) equal to the product of the global weight 136($x$) and any of the applicable local weights 138 included in the playgraph dataset 130($x$). For the reachable block 142($y$), the applicable local weights 138 are the local weights 138 that specify likelihoods associated with following the potential playback path that includes the reachable block 142($y$).

The distance 152($x$) correlates to the minimum number of frames that are required to be displayed on the client device 190 before the reachable block 142($y$) could be required for display on the client device 190. In operation, for the reachable block 142($y$) included in the playback graph 132($x$), the selection engine 140 sets the distance 152($y$) equal to the number of frames along the associated potential playback path between the playback position 134($x$) and the reachable block 142($y$). In alternate embodiment, the distances 152 may be specified in any technically feasible fashion, such as playback times.

Importantly, any number of the distances 152 may be non-linear with respect to the media content items 120, reflecting that one or more of the blocks 122 may be skipped and therefore not included in the associated potential playback path. For example, if a potential playback path included in the playback graph 132($x$) included frames 1-100 and then skipped to frames 1000-2000 of the media item 122(1), the playback position 134($x$) was frame 98, and the associated reachable block 142($y$) started at frame 1000, then the distance 152($y$) would be 3.

For each reachable block 142($y$), the selection engine 140 computes the streaming value 154($y$) using the streaming value engine 160. The streaming value 154(y) estimates an importance of streaming the reachable block 142(y) to the display device 190 with respect to reducing re-buffering events based on the distance 152(y). The streaming value engine 160 includes, without limitation, a distance/value curve 162 that expresses a relationship between the distance 152 and the streaming value 154. The distance/value curve 162 may be any curve that expresses the streaming value 154 as a monotonically decreasing function of the distance 152 such that as the distance 152 increases, the streaming value 154 decreases.

In some embodiments, the distance/value curve 162 is a re-buffer risk curve that maps a buffer level of the playback buffer 194 to a risk of re-buffer. The re-buffer risk curve may be determined empirically. In various embodiments, the rate of re-buffer risk reduction is the slope of the re-buffer risk curve multiplied by the expected download rate for the block 122, where the expected download rate is expressed in terms of "media content duration downloaded" divided by "wall-clock elapsed time." Consequently, the rate of re-buffer risk reduction is a function of both the throughput and the encoding rate of the block 122.

In operation, for each of the reachable blocks 142(y), the selection engine 140 transmits the distance 152(y) to the streaming value engine 160. The streaming value engine 160 maps the distance 152(y) to the streaming value 154(y) using the distance/value curve 162. The streaming value engine 160 returns the streaming value 154(y) to the selection engine 140, and the selection engine 140 stores the streaming value 154(y) in the reachable block dataset 150(y). In alternate embodiments, the streaming value engine 160 does not include the distance/value curve 162 and may compute the streaming value 154 based on the distance 152 in any technically feasible fashion. In the same or other alternate embodiments, each of the streaming values 154 may be values for any type of metric associated with re-buffering events and/or any other aspects of quality of experience. For instance, in some embodiments, each of the streaming values 154 may represent a reduction in the total duration of re-buffering events. In some embodiments, the streaming value engine 160 may be external to the graph streaming application 106. In other embodiments, the streaming value engine 160 may be integrated into the selection engine 140.

Subsequently, for each of the reachable blocks 142(y), the selection engine 140 sets the score 158(y) equal to the product of the playback probability 156(y) and streaming value 154(y). The score 158(y) correlates to an estimated likelihood that streaming the reachable block 142(y) would reduce re-buffering events. The selection engine 140 then compares the scores 158 to identify the reachable block 142 associated with the highest score 158. Notably, streaming the selected reachable block 142 to the client device 190 has a greater estimated likelihood of reducing re-buffering events than streaming any of the other unbuffered blocks 122 to the client device 190. The selection engine 140 then sets the best scoring block 148 equal to the identified reachable block 142. For example and as shown in italics, the selection engine 140 could set the best scoring block 148 equal to the reachable block 142(R) that is equal to the block 122(9). The selection engine 140 then transmits the best scoring block 148 to the block streaming application 180 for transmission to the playback application 192.

Advantageously, the scoring engine 140 evaluates all of the potential playback paths across all of the playback graphs 132 included in the session data 104 to determine the best scoring block 148. Each of the playback graphs 132 represents a different streaming use case and may include portions of any number of requested media content items 120 and portions of any number of media content items 120 that the viewer is likely to request. As part of determining the best scoring block 148, the scoring engine 140 automatically determines whether streaming for the requested media content item 120 or pre-fetching for one of the other media content items 120 is a better use of the available resources (e.g., connection bandwidth). The best scoring block 148 therefore enables a globally optimized approach to buffering media content.

It will be appreciated that the system shown herein is illustrative and that variations and modifications are possible. The connection topology, including the location and arrangement of the media data 102, the session data 104, the client device 190, the block streaming application 180, the graph streaming engine 130, the selection engine 140, and the streaming value engine 160 may be modified as desired. In certain embodiments, one or more components shown in FIG. 1 may not be present.

Note that the techniques described herein are illustrative rather than restrictive, and may be altered without departing from the broader spirit and scope of the embodiments. Many modifications and variations will be apparent to those of ordinary skill in the art without departing from the scope and spirit of the described embodiments and techniques. Further, in various embodiments, any number of the techniques disclosed herein may be implemented while other techniques may be omitted in any technically feasible fashion.

For instance, in alternate embodiments, any amount of the functionality of the graph streaming application 130 and/or the block streaming application 180 may reside and/or execute on the client device 190 as part of any number of software applications, such as the playback application 192. In various embodiments, when the selection engine 140 determines a new best scoring block 148, the selection engine 140 may cause the best scoring block 148 to be stored in the playback buffer 194 in any technically feasible fashion. For instance, the selection engine 140 may request that a server associated with a media streaming service transmit the best scoring block 148 to the playback application 192 for storage in the playback buffer 194. The best scoring block 148 may subsequently be played back on the client device 190.

Comparing Reachable Blocks Across Playgraphs

Figure 2:
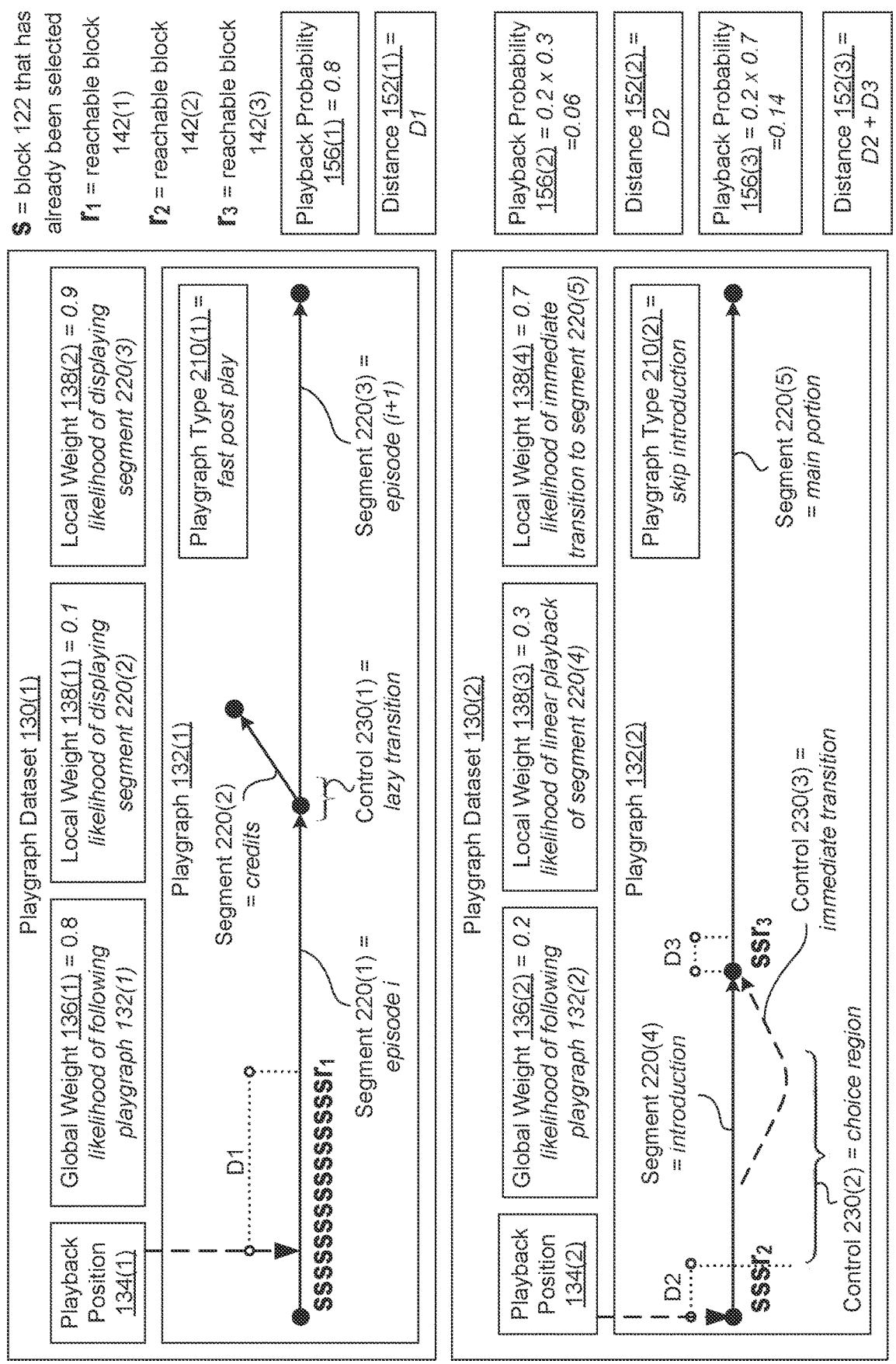
FIG. 2 sets forth two different exemplary illustrations of the playgraph datasets of FIG. 1, according to various embodiments.

FIG. 2 sets forth exemplary illustrations of the playgraph datasets 130(1) and 130(2) of FIG. 1, according to various embodiments. As described previously herein in conjunction with FIG. 1, each of the playgraph datasets 130 includes, without limitation, the playgraph 132, the playback position 134, the global weight 136, and any number of local weights 138. As shown, each of the playgraphs 132 includes, without limitation, a playgraph type 210, any number and arrangement of segments 220, and any number and type of controls 230. For explanatory purposes only, dashed arrows are used to indicate exemplary playback positions 134(1) and 134(2), and italics are used to indicate exemplary data associated with the global weights 136, the local weights 138, the playback types 210, the segments 220, and the controls 230.

Each of the segments 220 includes, without limitation, a contiguous subset of the blocks 122 included in a single media content item 120. Different segments 220 may be associated with the same media content item 120 or may be associated with different media content items 120. For example, the segments 220(a) and 220(b) could both be associated with the media content item 120(a) that includes the blocks 122 representing a title A. The segment 220(a) could include a first subset of the blocks 122 that correspond to the introduction of the title A, and the segment 220(b) could include a second subset of the blocks 122 that correspond to the main portion of the title A. In another example, the segment 220(c) could equal the media content item 120(c) representing the introduction of a title B, and the segment 220(d) could equal the media content item 120(d) representing the main portion of the title B.

The number of blocks 122 included in one segment 220 may vary from the number of the blocks in the other segments 220. The blocks 122 within each segment 220 are arranged in a temporally sequential fashion, and each segment 220 may be connected to any number of the other segments 220 via any number of transitions. For explanatory purposes only, each of the segments 220 is depicted as a solid line that lies between two filled circles representing potential playback points and is annotated with an arrow indicating the temporally sequential order of the blocks 220 included in the segment 220. Each of the potential playback points may be shared by any number of the segments 220.

Together, the controls 230 can select a playback path from any number of potential playback paths specified in the playgraph 132. The playback path corresponds to the actual order in which the playback application 192 displays the blocks 122 on the client device 190. Each potential playback path corresponds to a different order in which the playback application 192 can potentially display the blocks 122 on the client device 190. As the playback application 192 displays the blocks 122 following a particular playback graph 132, the length of the playback path increases and the number of potential playback paths in the playback graph 132 typically decreases.

The playgraph type 210 indicates an exemplary streaming use case. As described in greater detail herein, some examples of playgraph types 210, without limitation, fast post play, skip introduction, branched narrative, linear, optional insert, repeat, and navigable list. In alternate embodiments, each playgraph 132 may specify multiple playgraph types 210. In the same or other embodiments, each playgraph type 210 may indicate any number of exemplary streaming use cases in any combination.

As shown, the playgraph 132(1) includes, without limitation, the playgraph type 210(1) of fast post play, the segments 220(1)-220(3), and the control 230(1) associated with a "lazy transition." As referred to herein, a lazy transition is a transition between the end of one segment 220 and the start of another segment 220 that occurs by default. The playgraph type 210 of fast post play is associated with an exemplary streaming use case in which, after one episode of a television show is displayed, either the next episode of the television show is automatically displayed or, in response to input from a viewer, credits associated with the episode are displayed. For explanatory purposes only, the segment 220(1) corresponds to an episode i of a television show, the segment 220(2) corresponds to credits for the episode i of the television show, and the segment 220(3) corresponds to an episode (i+1) of the television show.

The playgraph 132(1) specifies a default potential playback path and an alternate potential payback path. The alternate potential playback path can be activated via the control 230(1) in any technically feasible fashion before the playback position 134(1) reaches the control 230(1). For instance, in some embodiments, while displaying the last thirty seconds of the segment 220(1), the playback application 192 also displays a button that a viewer can click to watch the segment 230(2) representing the credits instead of the segment 230(3) representing the episode (i+1).

With respect to the control 230(1), the segment 220(1) is a single input segment 220, the segment 220(3) is a default output segment 220, and the segment 220(2) is an alternate output segment 220. Unless the control 230(1) is activated, the playback application 192 follows the default potential playback path. When following the default potential playback path, the playback application 192 sequentially displays the blocks 122 included in the segment 220(1), performs a lazy transition from the end block 122 included in the segment 220(1) to the start block 122 included in the segment 220(3), and sequentially displays the blocks 122 included in the segment 220(3). Accordingly, the playback application 192 sequentially displays episodes i and (i+1) of the television show.

By contrast, if the control 230(1) is activated, then the playback application 192 follows the alternative potential path. When following the alternative potential playback path, the playback application 192 sequentially display the blocks 122 included in the segment 220(1), performs an alternate transition from the end block 122 included in the segment 220(1) to the start block 122 included in the segment 220(2), and sequentially displays the blocks 122 included in the segment 220(2). Accordingly, the playback application 192 sequentially displays episode i of the television show and the associated credits.

In alternate embodiments, each playgraph 132 that includes the playgraph type 210 of fast post play may include, without limitation, any number and structure of segments 220, at least one control 230 associated with a lazy transition, and any number and type of other controls 230. In the same or other alternate embodiments, the segments 220 included in a given playgraph 132 that includes the playgraph type 210 of fast post play may be associated with any number and types of media content items 120 (e.g., feature-length movies, advertisements, etc.).

As shown, the playgraph 132(2) includes, without limitation, the playgraph type 210(2) of skip introduction, the segments 220(4) and 220(5), the control 230(2) specifying a choice region, and the control 230(3) associated with an "immediate transition." As referred to herein, an immediate transition is an on-demand, non-linear transition between two non-contiguous blocks 122. The playgraph type 210 of skip introduction is associated with an exemplary streaming use case in which either the introduction of a title and then the main portion of the title are displayed or the introduction of the title is displayed until, in response to input from a viewer, the remainder of the introduction is skipped and the main portion of the title is displayed. For explanatory purposes only, the segment 220(4) corresponds to the introduction of a title and the segment 220(5) corresponds to the main portion of the title.

The playgraph 132(2) specifies a default potential playback path and any number of alternate potential playback paths. An alternate potential playback path can be activated via the control 230(3) while the playback position 134(2) is within the choice region specified by the control 230(2). If the choice region specified by the control 230(2) spans multiple blocks 122, then each block 122 is associated with a different alternate potential playback path.

Unless the control 230(3) is activated within the choice region specified via the control 230(2), the playback application 192 follows the default potential playback path. When following the default potential playback path, the playback application 192 sequentially display the blocks 122 included in the segment 220(4), performs a lazy transition from the end block 122 included in the segment 220(4) to the start block 122 included in the segment 220(5), and sequentially displays the blocks 122 included in the segment 220(5). Accordingly, the playback application 192 sequentially display the introduction of the title and the main portion of the title.

By contrast, if the control 230(3) is activated within the choice region specified by the control 230(2), then the playback application 192 follows an alternative potential path that is determined by the playback position 134(2) when the control 230(3) is activated. When following an alternate potential playback path, the playback application 192 sequentially displays the blocks 122 included in the segment 220(4) until the control 230(3) is activated, performs an immediate transition to the start block 122 included in the segment 220(5) (skipping the remaining blocks 122 included in the segment 220(4)), and sequentially displays the blocks 122 included in the segment 220(5). Accordingly, the playback application 192 displays an initial portion of the introduction of the title, does not display the remainder of the introduction, and displays the main portion of the title.

In alternate embodiments, each playgraph 132 that includes the playgraph type 210 of skip introduction may include, without limitation, any number and structure of segments 220, at least one control 230(3) that is associated with an immediate transition, and any number and type of other controls 230. In the same or other alternate embodiments, a playgraph 132 that includes the playgraph type 210 of skip introduction may represent any number and types of media content items 120 (e.g., feature-length movies, advertisements, etc.).

For explanatory purposes only, FIG. 2 depicts a point in time at which the playback application 192 has displayed the first four blocks included in the segment 220(1) as per the default playback path specified via the playback graph 132(1). As depicted with a dotted arrow, the playback position 134(1) therefore specifies the end of the fourth block 122 included in the segment 220(1). By contrast, the playgraph application 192 has not displayed any of the blocks 122 included in the playgraph 130(2) and, as depicted with a dotted arrow, the playback position 134(2) specifies the start of the playgraph 130(2).

The buffered blocks 122 that the selection engine 140 has previously selected for streaming to the client device 190 are annotated on the associated playgraph 132 using the symbol "s". As shown, the buffered blocks 122 are the first fifteen blocks 122 included in the segment 220(1), the first three blocks 122 included in the segment 220(4), and the first two blocks 122 included in the segment 220(5). Neither the segment 220(2) nor the segment 220(3) include any buffered blocks 122.

As described previously herein, upon receiving the selection request 176, the selection engine 140 evaluates each of the playgraphs 132 to determine the reachable blocks 142. For each playgraph 132(x), the reachable blocks 142 are the unbuffered blocks 122 that are reachable from the playback position 134(x) along a potential playback path via the buffered blocks 122.

For the playgraph 132(1), the selection engine 140 determines that the sixteenth block 122 included in the segment 220(1) is the reachable block 142(1). The reachable block 142(1) is annotated on the playgraph 132(1) using the symbol "$r_1$". For the playgraph 132(2), the selection engine 140 determines that the fourth block 122 included in the segment 220(4) and the third block 122 included in the segment 220(5) are, respectively, the reachable blocks 142 (2) and 142(3). The reachable blocks 142(2) and 142(3) are annotated on the playgraph 132(2) using, respectively, the symbols "$r_2$" and "$r_3$".

For each reachable block 142(y), the selection engine 140 computes the playback probability 156(y) and the distance 152(y). In general, the selection engine 140 sets the playback probability 156(y) equal to the product of the global weight 136 included in the associated playback dataset 130 and any applicable local weight(s) 138. The applicable local weight(s) 138 are the local weight(s) 138 that are associated with following the potential playback path from the associated playback position 134 to the reachable block 142(y). In a complementary fashion, the selection engine 140 sets the distance 152(x) equal to the number of frames along the potential playback path from the associated playback position 134 to the reachable block 142(y).

As shown, the playgraph dataset 130(1) includes the global weight 136(1), the local weight 138(1), and the local weight 138(2). The global weight 136(1) is an estimated likelihood that the playback application 192 follows the playgraph 132(1). The local weight 138(1) of 0.1 is an estimated likelihood that the playback application 192 displays the segment 220(3) (i.e., the credits). The local weight 138(2) of 0.9 is an estimated likelihood that the playback application 192 displays the segment 220(2) (i.e. episode (i+1)).

Because the potential playback path from the playback position 134(1) to the reachable block 142(1) is not associated with any of the local weights 138, the selection engine 140 sets the playback probability 156(1) equal to the global weight 136(1). The selection engine 140 sets the distance 152(1) equal to the number of frames between the end of the fourth block 122 included in the segment 220(1) and the start of the sixteenth block 122 included in the segment 220(1). The distance 152(1) is depicted on the playgraph 132(1) as "D1".

As shown, the playgraph dataset 130(2) includes the global weight 136(2), the local weight 138(3), and the local weight 138(4). The global weight 136(1) of 0.2 is an estimated likelihood that the playback path follows the playgraph 132(2). The local weight 138(3) of 0.3 is an estimated likelihood of a linear playback of the segment 220(4) (i.e., the introduction). By contrast, the local weight 138(4) of 0.7 is an estimated likelihood that of an immediate transition to the segment 220(5) (i.e., the main portion).

Since the potential playback path from the playback position 134(2) to the reachable block 142(2) is associated with the local weight 138(3), the selection engine 140 sets the playback probability 156(2) equal to 0.06 (the product of the global weight 136(2) and the local weight 138(3)). And since the potential playback path from the playback position 134(2) to the reachable block 142(3) is associated with the local weight 138(4), the selection engine 140 sets the playback probability 156(3) equal to 0.14 (the product of the global weight 136(2) and the local weight 138(4)).

The selection engine 140 sets the distance 152(2) equal to the number of frames between the start of the first block 122 included in the segment 220(4) and the start of the fourth block 122 included in the segment 220(4). The distance 152(2) corresponds to the portion of the segment 220(4) depicted as "D2" on the playgraph 132(2). As persons skilled in the art will recognize, to reach the reachable block 142(3) from the playback position 134(2) via the buffered blocks 122 requires an immediate transition at the start of the choice region associated with the control 230(2). To properly account for the non-linearity of the immediate transition, the selection engine 140 sets the distance 152(3) equal to the sum of D2 and D3. D2 is equal to the number of frames between the start of the first block 122 included in the segment 220(4) and the start of the choice region associated with the control 230(2). D3 is equal to the number of frames between the start of the first block 122 included in the segment 220(5) and the reachable block 142(3).

As described previously herein in conjunction with FIG. 1, for each of the reachable blocks 142(y), the selection engine 140 uses the streaming value engine 160 to compute the streaming value 154(y) based on the distance 152(y). Subsequently, for each of the reachable blocks 142(y), the selection engine 140 computes the score 158(y) as the product of the playback probability 156(y) and the streaming value 154(y). The selection engine 140 compares the scores 158 to determine the best scoring block 148 from the reachable blocks 142(1)-142(3). The selection engine 140 then transmits the best scoring block 148 to the block streaming application 180 for streaming to the client device 190.

Figure 3:
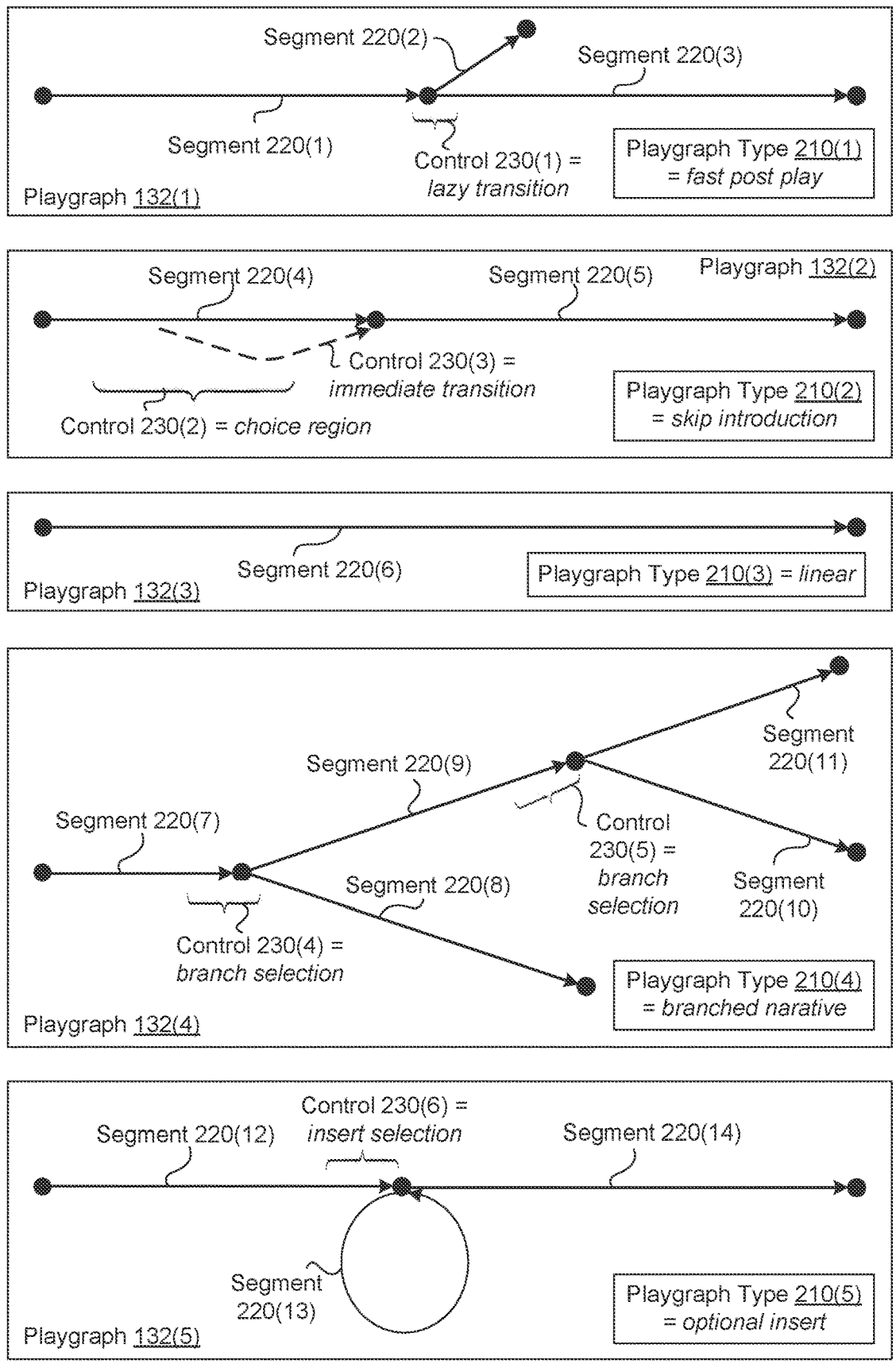
FIG. 3 sets forth give different exemplary illustrations of the playgraphs of FIG. 1, according to other various embodiments.

FIG. 3 sets forth exemplary illustrations of the playgraphs 132 of FIG. 1, according to other various embodiments. As described previously herein in conjunction with FIG. 2, each of the playgraphs 132 includes, without limitation, the playgraph type 210, any number of segments 220, and any number and type of controls 230.

As shown, the playgraph 132(1) includes, without limitation, the playgraph type 210(1) of fast post play, the segments 220(1)-220(3), and the control 230(1) associated with a lazy transition. The playgraph 132(1) specifies a default potential playback path and an alternate potential payback path. The alternate potential playback path can be activated via the control 230(1) in any technically feasible fashion.

When following the default potential playback path, the playback application 192 sequentially display the blocks 122 included in the segment 220(1), performs a lazy transition from the end block 122 included in the segment 220(1) to the beginning block 122 included in the segment 220(3), and sequentially displays the blocks 122 included in the segment 220(3). By contrast, when following the alternate potential playback path, the playback application 192 sequentially displays the blocks 122 included in the segment 220(1), performs a lazy transition from the end block 122 included in the segment 220(1) to the start block 122 included in the segment 220(2), and sequentially displays the blocks 122 included in the segment 220(2).

As shown, the playgraph 132(2) includes, without limitation, the playgraph type 210(2) of skip introduction, the segments 220(4) and 220(5), the control 230(2) associated with a choice region, and the control 230(3) associated with an immediate transition. As described previously herein in conjunction with FIG. 2, the playgraph type 210 of skip introduction is associated with a default potential playback path and any number of alternate potential playback paths. The alternate potential playback path can be activated via the control 230(3) while the playback position 134(2) (not shown in FIG. 3) is within the choice region specified by the control 230(2). If the choice region specified by the control 230(2) spans multiple blocks 122, then each block 122 is associated with a different alternate potential playback path.

When following the default potential playback path, the playback application 192 sequentially displays the blocks 122 included in the segment 220(4), performs a lazy transition from the end block 122 included in the segment 220(4) to the start block 122 included in the segment 220(5), and sequentially displays the blocks 122 included in the segment 220(5). When following an alternate potential playback path, the playback application 192 sequentially displays the blocks 122 included in the segment 220(4) until the control 230(3) is activated, performs an immediate transition to the start block 122 included in the segment 220(5) (skipping the remaining blocks 122 included in the segment 220(4)), and sequentially displays the blocks 122 included in the segment 220(5).

As shown, the playgraph 132(3) includes, without limitation, the playgraph type 210(3) of linear and the segment 220(6). The playgraph type 210(3) of linear is associated with a single, default, potential playback path. When following the playgraph 132(3), the playback application 192 sequentially displays the blocks 122 included in the segment 220(6). The segment 220(6) may represent any one of the media content items 120 or any portion of any one of the media content items 120. In various embodiments, a conventional playlist is represented as a sequence of playgraphs 132, where each of the playgraphs 132 has the playgraph type 210 of linear. In the same or other embodiments, the playgraph type 210 of each new playgraph 132 defaults to linear. In alternate embodiments, each playgraph 132 having the playgraph type 210 of linear may include, without limitation, any number of segments 220.

As shown, the playgraph 132(4) includes, without limitation, the playgraph type 210(4) of branched narrative, the segments 220(7)-220(11), and the controls 230(4)-(5) associated with branch selections. Each control 230 that is associated with a branch selection is also referred to herein as the "branch selection control 230." In alternate embodiments, each playgraph 132 having the playgraph type 210 of branched narrative may include, without limitation, any number of segments 220, at least one branch selection control 230, and any number of additional controls 230.

In general, the playgraph type 210 of branched narrative is associated with multiple potential playback paths, where the total number of potential playback paths is determined by the structure of the playgraph 132 (i.e., the total number and arrangement of the segments 220 and the controls 230). Each branch selection control 230 is associated with a single input segment 220 and two or more potential output segments 220. For each branch selection control 230, the actual output segment 220 is selected from the potential output segments 220 before the playback position 134 reaches the end block 122 of the input segment 220. The actual output segment 220 may be selected in any technically feasible fashion (e.g., via a GUI included in the playback application 192). In various embodiments, for each branch selection control 230, one of the output segments 220 may be a default output segment 220.

As shown, the branch selection control 230(4) is associated with the input segment 220(7) and the two potential output segments 220(8) and 220(9). The branch selection control 230(5) is associated with the input segment 220(9) and the two potential output segments 220(10) and 220(11). Accordingly, the playgraph 132(4) is associated with three potential playback paths. If the segment 220(8) is selected as the actual output segment 220 associated with the branch selection control 230(4), then the playback application 192 sequentially displays the segments 220(7) and 220(8). If the segments 220(9) and 220(10) are selected as the actual output segments 220 associated with, respectively, the branch selection controls 230(4) and 230(5), then the playback application 192 sequentially displays the segments 220(7), 220(9) and 220(10). If the segments 220(9) and 220(11) are selected as the actual output segments 220 associated with, respectively, the branch selection controls 230(4) and 230(5), then the playback application 192 sequentially displays the segments 220(7), 220(9) and 220 (11).

In various embodiments, the playgraph 132(4) represents a "choose-your-own-story" viewer experience, where the branch selection controls 230(4) and 230(5) enable the viewer to make choices that alter the story line while watching, respectively, the segments 220(7) and 220(9).

As shown, the playgraph 132(5) includes, without limitation, the playgraph type 210(3) of optional insert, the segment 220(12)-(14), and the control 230(6) associated with an insert selection. In various embodiments, the playgraph type 210 of optional insert is associated with two potential playback paths. When a default potential playback path is followed, the playback application 192 sequentially displays the segments 220(12) and 220(14). An alternate potential playback path can be activated via the control 230(6) until the playback position 134(2) reaches the end frame included in the segment 220(13). When the alternate potential playback path is followed, the playback application 192 sequentially displays the segments 220(12), 220(13), and 220(14).

In various embodiments, any number of the playgraphs 132 may be associated with a combination of playgraph types 210. In the same or other embodiments, each playgraph 132 may include, without limitation, the playgraph type 210 that indicates any technically feasible streaming use case, any number and arrangement of segments 122, and any number and type of controls 230. For instance, in various embodiments, in addition to or instead of the streaming use cases of fast post play, skip intro, branched narrative, linear, and optional insert depicted in FIG. 3, the playgraph type 210 may indicate the streaming use cases of repeat and navigable list.

In some embodiments, if the playgraph 132 has the playgraph type 210 of repeat, then the playgraph 132 allows viewers to watch any number of the segments 220 repeatedly and in any combination via any number of "repeat" controls 230. Each repeat control 230 is associated with a default potential playback path that includes a transition in a forward direction and an alternate potential playback path that includes a transition from the end of the segment 220 back to the start of the same segment 220. In some embodiments, if the playgraph 132 has the playgraph type 210 of navigable list, then the playgraph 132 allows viewers to watch the different segments 220 in any combination of forward and backward directions via any number of "bidirectional" controls 230.

Advantageously, as illustrated by the playgraphs 132(1)-132(5), the playgraphs 132 can be used to represent a wide variety of streaming use cases. To enable re-buffering reduction for a new streaming use case, oftentimes an engineer can relatively easily create a new playgraph 132 based on any number of existing playgraphs 132. Since the graph streaming application 106 implements a playgraph-based algorithm instead of algorithm(s) that are targeted for specific streaming use case(s), the graph streaming application 106 automatically supports the new streaming use case via the new playgraph 132. Furthermore, the engineer can determine initial values or functions for the global weight 136 and local weights 138 and subsequently refine the values or functions based on empirical results.

Figure 4:
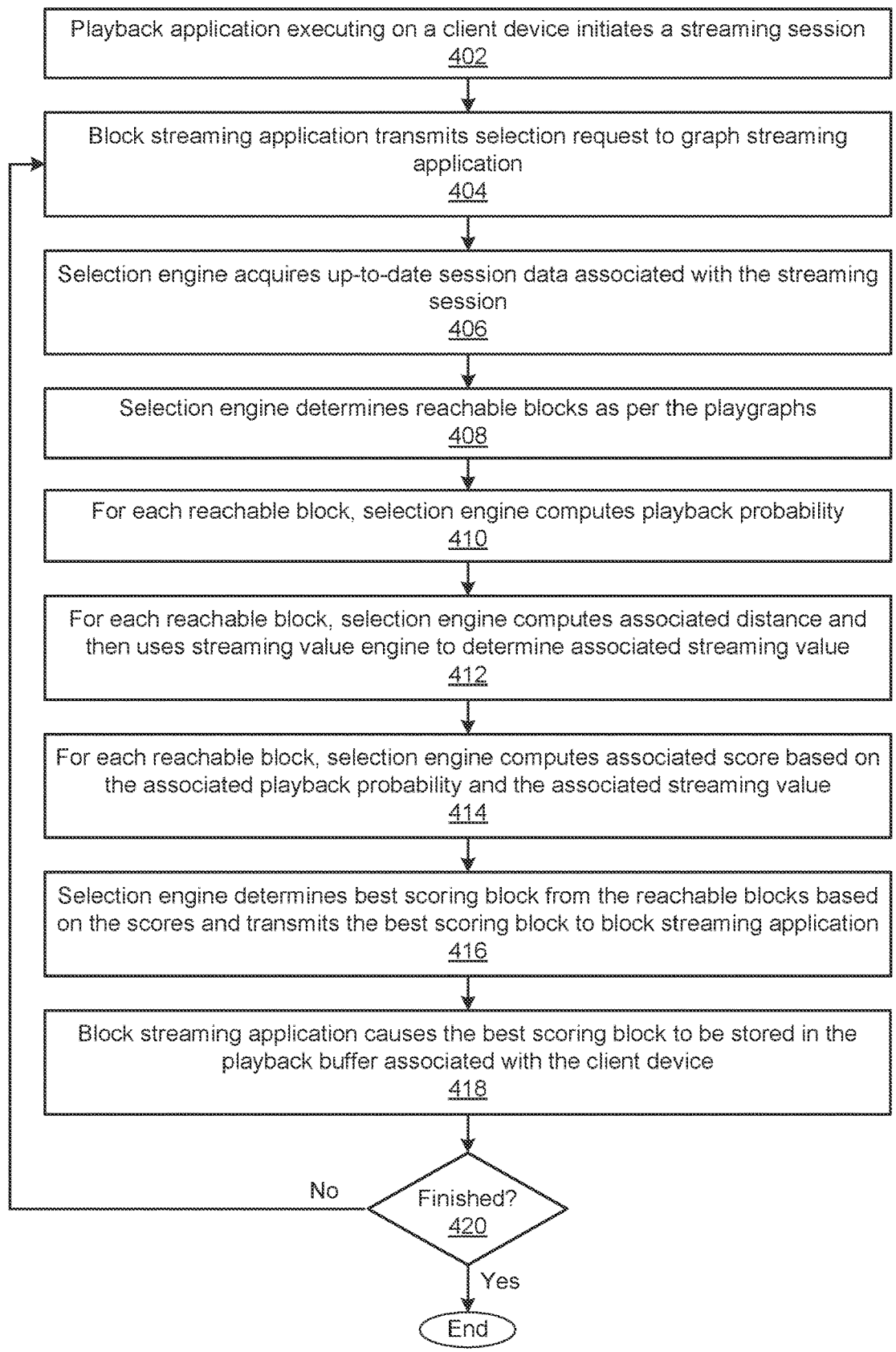
FIG. 4 is a flow diagram of method steps for streaming media content, according to various embodiments.

FIG. 4 is a flow diagram of method steps for streaming media content.

Although the method steps are described with reference to the systems of FIGS. 1-3, persons skilled in the art will understand that any system configured to implement the method steps, in any order, falls within the scope of the embodiments.

As shown, a method 400 begins at step 402, where the playback application 192 executing on the client device 190 initiates a streaming session. In alternate embodiments, any software application executing on any compute instance 110 may initiate the streaming session associated with the client device 190 in any technically feasible fashion. At step 404, the block streaming application 180 transmits the selection request 176 to the graph streaming application 106. At step 406, the selection engine 140 acquires up-to-date session data 104 associated with the streaming session.

At step 408, the selection engine 140 determines the reachable blocks 142 from the blocks 122 included in any number of the media content item(s) 120 as per the playgraph(s) 132 included in the playgraph dataset(s) 130. At step 410, for each of the reachable blocks 142(y), the selection engine 140 computes the playback probability 156(y) based on the associated global weight 136 and the associated local weight(s) 138. At step 412, for each of the reachable blocks 142(y), the selection engine 140 computes the distance 152(y) and then uses the streaming value engine 160 to determine the streaming value 154(y) based on the distance 152(y).

At step 414, for each of the reachable blocks 142(y), the selection engine 140 computes the score 158(y) based on the playback probability 156(y) and the streaming value 154(y). At step 416, the selection engine 140 determines the best scoring block 148 from the reachable blocks 142 based on the associated scores 158. The selection engine 140 then transmits the best scoring block 148 to the block streaming application 180.

At step 418, the block streaming application 180 causes the best scoring block 148 be stored in the playback buffer 194 associated with the client device 190. The block streaming application 180 may cause the best scoring block 148 to be stored in the playback buffer 194 in any technically feasible fashion. For instance, in some embodiments, the block streaming application 180 transmits the best scoring block 148 to the client device 190 for storage in the playback buffer 192. The block streaming application 180 may determine when to transmit the best scoring block 148 to the block streaming application 180 in any technically feasible fashion. For instance, in some embodiments, the block streaming application 180 waits until the total blocks in-flight 172 is less that the in-flight limit 174. At step 420, the block streaming application 180 determines whether the streaming session is finished. If, at step 420, the block streaming application 180 determines that the streaming session is finished, then the method 400 terminates.

If, however, at step 420, the block streaming application 180 determines that the streaming session is not finished, then the method 400 returns to step 404, where the block streaming application 180 transmits a new selection request 176 to the graph streaming application 106. The block streaming application 180, the graph streaming application 106, and the selection engine 140 continue to cycle through steps 404-420 until, at step 420, the block streaming application 180 determines that the streaming session is finished.

In sum, the disclosed techniques may be used to efficiently and effectively reduce re-buffering events associated with streaming media content to client devices. In one embodiment, a block streaming application uses a graph streaming engine to optimize the selection of and order in which to stream blocks of media content to a playback application for display on a client device. The graph streaming application includes, without limitation, a selection engine and a streaming value engine. To stream a new block to the playback application, the block streaming application transmits a selection request to the graph streaming application. In response, the selection engine acquires one or more up-to-date playgraph datasets that are associated with the playback application. Each playgraph dataset specifies, without limitation, a different playback graph, a playback position, a global weight, and any number of local weights.

Each playback graph specifies any number of potential playback paths and, along each potential playback path, the "steamed" blocks that the graph streaming engine has already selected for streaming. For each playback graph, the selection engine determines the blocks that can be reached along a potential playback path from an associated playback position via the buffered blocks. For each such reachable block, the selection engine estimates a playback probability based on the global weight of the associated playback graph and any local weights applicable to the associated potential playback path. For each reachable block, the selection engine computes a potentially non-linear distance (e.g., skipping over one or more blocks in a media content item) along the associated potential playback path between the associated playback position and the reachable block. For each reachable block, the selection engine uses the streaming value engine to determine an associated streaming value based on the associated distance. The streaming value correlates to the current importance of streaming the reachable block to reducing the risk of re-buffering events.

Subsequently, for each reachable block, the selection engine sets an associated score equal to the product of the associated playback probability and the associated streaming value. The selection engine compares the scores of the reachable blocks to select the best scoring block. The selection engine then transmits the best scoring block to the block streaming application for transmission to the playback application.

At least one technical advantage of the disclosed techniques relative to the prior art is that the graph streaming application implements a single algorithm that can perform both streaming and pre-fetching across different streaming use cases. Because implementing effective buffering for a new streaming use case involves generating a relatively simple playgraph instead of developing both a new streaming application and a new pre-fetching application, the time and effort required to reliably reduce re-buffering for each new streaming use case is substantially reduced. Furthermore, unlike prior art techniques, the graph streaming application accounts for the different potential playback paths across any number of media content items and any number of streaming use cases when selecting the next block to be buffered. And, within each potential playback path, the graph streaming application accurately accounts for any non-linear events, such as skipping blocks of a media content item. Consequently, the likelihood that each block of media content is properly buffered by a client device before the block is required for display on the client device is increased. As a result, the likelihood of re-buffering events is decreased and the overall quality of the viewer experience can be increased. These technical advantages provide one or more technological advancements over prior art approaches.

1. In some embodiments, a computer-implemented method for streaming media content to a client device comprises computing a first distance along a first potential playback path between a first playback position and a first media content block; computing a first score for the first media content block based on the first distance and a first probability that the first potential playback path is to be followed during a playback session associated with the client device; computing a second distance along a second potential playback path between a second playback position and a second media content block; computing a second score for the second media content block based on the second distance and a second probability that the second potential playback path is to be followed during the playback session; comparing the first score to the second score to determine that the first media content block should be buffered by the client device; and causing the first media content block to be stored in a playback buffer for subsequent playback on the client device.

2. The computer-implemented method of clause 1, wherein the first media content block is included in a first media content item, and the second media content block is included in a second media content item that differs from the first media content item.

3. The computer-implemented method of clauses 1 or 2, wherein the first potential playback path comprises a sequence of media content blocks, and further comprising determining that each media content block that precedes the first media content block in the sequence of media content blocks has been previously stored in the playback buffer.

4. The method of any of clauses 1-3, wherein computing the first distance comprises computing a first partial distance between the first playback position and the start of a control region associated with an immediate transition to the start of a third media content block; computing a second partial distance between the start of the third media content block and the start of the first media content block; and performing an addition operation between the first partial distance and the second partial distance.

5. The computer-implemented method of any of clauses 1-4, wherein computing the first distance comprises computing a first number of frames between the first playback position and the end of a first segment of a first media content item; and computing a second number of frames between the start of a second segment of a second media content item and the start of the first media content block, wherein the first media content block is included in the second segment; and performing an addition operation between the first number of frames and the second number of frames.

6. The computer-implemented method of any of clauses 1-5, wherein the first playback position is associated with a first media content item and corresponds to a frame that is displayed on the client device, and the second playback position corresponds to a start frame associated with the second potential playback path.

7. The computer-implemented method of any of clauses 1-6, wherein the first potential playback path is included in a playback graph that represents at least one of a fast post play use case, a skip introduction use case, a branched narrative use case, or a repeat use case.

8. The computer-implemented method of any of clauses 1-7, where computing the first score comprises mapping the first distance to a first streaming value based on a re-buffer risk curve, wherein the first streaming value is associated with an importance of transmitting the first media content block to the client device to reducing the risk of re-buffering events; and performing a multiplication operation between the first streaming value and the first probability.

9. The computer-implemented method of any of clauses 1-8, wherein the first probability equals a product of one or more local weights associated with the first potential playback path and a global weight that corresponds to a probability that a playback graph that includes the first potential playback path is to be followed during the playback session.

10. The computer-implemented method of any of clauses 1-9, wherein the first media content block is included in a first episode of a television show, and the second media content block is included in a second episode of the television show.

11. In some embodiments, one or more non-transitory computer readable media include instructions that, when executed by one or more processors, cause the one or more processors to stream media content to a client device by performing the steps of computing a first distance along a first potential playback path between a first playback position and a first media content block that has not been previously stored in a playback buffer; computing a first score for the first media content block based on the first distance and a first probability that the first potential playback path is to be followed during a playback session associated with the client device; computing a second distance along a second potential playback path between a second playback position and a second media content block that has not been previously stored in the playback buffer; computing a second score for the second media content block based on the second distance and a second probability that the second potential playback path is to be followed during the playback session; performing one or more ranking operations on a plurality of scores that includes the first score and the second score to determine that the first media content block should be buffered by the client device; and causing the first media content block to be stored in the playback buffer for subsequent playback on the client device.

12. The one or more non-transitory computer readable media of clause 11, wherein a sequence of blocks associated with a first media content item comprises a sequence of the first media content block, at least a third media content block, and the second media content block.

13. The one or more non-transitory computer readable media of clauses 11 or 12, wherein the first potential playback path comprises a sequence of media content blocks, and further comprising determining that each media content block that precedes the first media content block in the sequence of media content blocks has been previously stored in the playback buffer.

14. The one or more non-transitory computer readable media of any of clauses 11-13, wherein computing the first distance comprises determining that the first playback position is within a control region associated with an immediate transition to the start of a third media content block; and setting the first distance equal to the total number of frames along the first potential playback path that reside between the start of the third media content block and the start of the first media content block.

15. The one or more non-transitory computer readable media of any of clauses 11-14, wherein the first playback position is associated with a first media content item and corresponds to a frame that is displayed on the client device, and the second playback position corresponds to a start frame associated with the second potential playback path.

16. The one or more non-transitory computer readable media of any of clauses 11-15, wherein the first potential playback path is included in a playback graph that represents at least one of a fast post play use case, a skip introduction use case, a branched narrative use case, or a repeat use case.

17. The one or more non-transitory computer readable media of any of clauses 11-16, where computing the first score comprises computing a first streaming value based on the first distance, wherein the first streaming value is associated with an importance of transmitting the first media content block to the client device to reducing the risk of re-buffering events; and performing a multiplication operation between the first streaming value and the first probability.

18. The one or more non-transitory computer readable media of any of clauses 11-17, wherein the first probability equals a product of one or more local weights associated with the first potential playback path and a global weight that corresponds to a probability that a playback graph that includes the first potential playback path is to be followed during the playback session.

19. The one or more non-transitory computer readable media of any of clauses 11-18, wherein the first media content block is included in an introduction to a movie, and the second media content block is included in a main portion of the movie.

20. In some embodiments, a system comprises one or more memories storing instructions; and one or more processors that are coupled to the one or more memories and, when executing the instructions, are configured to compute a first distance along a first potential playback path between a first frame that is displayed on a client device and a first media content block; compute a first score for the first media content block based on the first distance and a first probability that the first potential playback path is to be followed during a playback session associated with the client device; compute a second distance along a second potential playback path between the first frame or a start frame of the second potential playback path and a second media content block; compute a second score for the second media content block based on the second distance and a second probability that the second potential playback path is to be followed during the playback session; compare the first score to the second score to determine that the first media content block should be buffered by the client device; and cause the first media content block to be stored in the playback buffer for subsequent playback on the client device.

Any and all combinations of any of the claim elements recited in any of the claims and/or any elements described in this application, in any fashion, fall within the contemplated scope of the embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for streaming media content to a client device, the method comprising:
    computing a first score for a first media content block based on a first probability that a first potential playback path included in a first playback graph is to be followed during a playback session associated with the client device, the first playback graph representing a first streaming use case, wherein the first probability is based on a product of one or more local weights associated with the first potential playback path and a global weight that corresponds to a third probability that the first playback graph that includes the first potential playback path is to be followed during the playback session;
    computing a second score for a second media content block based on a second probability that a second potential playback path included in a second playback graph is to be followed during the playback session, the second playback graph being different from the first playback graph and representing a second streaming use case different from the first streaming use case;
    comparing the first score to the second score to determine that the first media content block, instead of the second media content block, should be buffered by the client device; and
    causing, based on the comparison of the first score to the second score, the first media content block to be stored in a playback buffer for subsequent playback on the client device.

2. The computer-implemented method of claim 1, further comprising computing a first distance along the first potential playback path between a first playback position and the first media content block.

3. The computer-implemented method of claim 2, wherein the first score for the first media content block is further based on the first distance.

4. The computer-implemented method of claim 3, where computing the first score comprises mapping the first distance to a first streaming value based on a re-buffer risk curve, wherein the first streaming value is associated with an importance of transmitting the first media content block to the client device to reduce the risk of re-buffering events.

5. The computer-implemented method of claim 2, wherein computing the first distance comprises:
    computing a first partial distance between a first playback position and the start of a control region associated with a transition to the start of a third media content block; and
    computing a second partial distance between the start of the third media content block and the start of the first media content block.

6. The computer-implemented method of claim 2, wherein computing the first distance comprises:
    computing a first number of frames between a first playback position and the end of a first segment of a first media content item; and
    computing a second number of frames between the start of a second segment of a second media content item and the start of the first media content block.

7. The computer-implemented method of claim 2, wherein the first distance is computed based on one or more playback times.

8. The computer-implemented method of claim 1, further comprising computing a second distance along the second potential playback path between a second playback position and the second media content block.

9. The computer-implemented method of claim 8, wherein the second score for the second media content block is further based on the second distance.

10. The computer-implemented method of claim 1, wherein the first media content block is included in a first media content item, and the second media content block is included in a second media content item that differs from the first media content item.

11. The computer-implemented method of claim 1, wherein the first playback graph represents at least one of a fast post play use case, a skip introduction use case, a branched narrative use case, or a repeat use case.

12. The computer-implemented method of claim 1, wherein the first probability equals the product of the one or more local weights associated with the first potential playback path and the global weight that corresponds to the third probability that the first playback graph that includes the first potential playback path is to be followed during the playback session.

13. The computer-implemented method of claim 12, wherein each local weight comprises an estimated relative likelihood that a given potential playback path is to be followed.

14. The computer-implemented method of claim 1, wherein causing the first media content block to be stored in the playback buffer comprises transmitting a request for the first media content block over a network.

15. The computer-implemented method of claim 1, wherein causing the first media content block to be stored in the playback buffer comprises transmitting the first media content block to the client device over a network.

16. The computer-implemented method of claim 1, wherein neither the first media content block nor the second media content black has been previously stored in the playback buffer.

17. The computer-implemented method of claim 1, wherein the first potential playback path comprises a sequence of media content blocks, and further comprising determining that each media content block that precedes the first media content block in the sequence of media content blocks has been previously stored in the playback buffer.

18. The computer-implemented method of claim 1, wherein comparing the first score to the second score comprises performing one or more ranking operations on a plurality of scores that includes the first score and the second score to determine that the first media content block should be buffered by the client device.

19. One or more non-transitory computer-readable media including instructions that, when executed by one or more processors, cause the one or more processors to stream media content to a client device by performing the steps of:
computing a first distance along a first potential playback path between a first playback position and a first media content block, the first potential playback path being associated with a first playback graph representing a first streaming use case;
computing a first score for the first media content block based on the first distance and a first probability that the first potential playback path is to be followed during a playback session, wherein the first probability is based on a product of one or more local weights associated with the first potential playback path and a global weight that corresponds to a third probability that the first playback graph that includes the first potential playback path is to be followed during the playback session;
computing a second distance along a second potential playback path between a second playback position and a second media content block, the second potential playback path being associated with a second playback graph different from the first playback graph, and the second playback graph representing a second streaming use case different from the first streaming use case;
computing a second score for the second media content block based on the second distance;
comparing the first score to the second score to determine that the first media content block, instead of the second media content block, should be buffered by the client device; and
causing, based on the comparison of the first score to the second score, the first media content block to be stored in the playback buffer for subsequent playback on the client device.

20. The one or more non-transitory computer-readable media of claim 19, wherein the playback session is associated with the client device.

21. The one or more non-transitory computer-readable media of claim 19, wherein the second score is further based on a second probability that the second potential playback path is to be followed during a playback session associated with the client device.

22. The one or more non-transitory computer-readable media of claim 19, wherein neither the first media content block nor the second media content black has been previously stored in the playback buffer.

23. The one or more non-transitory computer readable media of claim 19, wherein the first potential playback path comprises a sequence of media content blocks, and further comprising determining that each media content block that precedes the first media content block in the sequence of media content blocks has been previously stored in the playback buffer.

24. The one or more non-transitory computer-readable media of claim 19, wherein comparing the first score to the second score comprises performing one or more ranking operations on a plurality of scores that includes the first score and the second score to determine that the first media content block should be buffered by the client device.

25. The one or more non-transitory computer-readable media of claim 19, wherein a sequence of blocks associated with a first media content item includes the first media content block and the second media content block.

26. The one or more non-transitory computer-readable media of claim 19, wherein computing the first distance comprises:
determining that the first playback position is within a control region associated with a transition to the start of a third media content block; and
setting the first distance equal to the total number of frames along the first potential playback path that reside between the start of the third media content block and the start of the first media content block.

27. The one or more non-transitory computer-readable media of claim 19, wherein the first playback position is associated with a first media content item and corresponds to a frame that is displayed on the client device, and the second playback position corresponds to a start frame associated with the second potential playback path.

28. The one or more non-transitory computer-readable media of claim 19, wherein the first media content block is included in an introduction to a movie, and the second media content block is included in a main portion of the movie.

29. The one or more non-transitory computer-readable media of claim 19, wherein the first media content block is included in a first episode of a television show, and the second media content block is included in a second episode of the television show.

30. The one or more non-transitory computer-readable media of claim 19, wherein causing the first media content block to be stored in the playback buffer comprises transmitting a request for the first media content block over a network.

31. The one or more non-transitory computer-readable media of claim 19, wherein causing the first media content block to be stored in the playback buffer comprises transmitting the first media content block to the client device over a network.

32. The one or more non-transitory computer-readable media of claim 19, wherein the first distance and the second distance are computed based on one or more playback times.

33. A system, comprising:
one or more memories storing instructions; and
one or more processors that are coupled to the one or more memories and, when executing the instructions, are configured to:
compute a first distance along a first potential playback path between a current frame and a first media content block, wherein the first potential playback path is included in a first playback graph;
compute a first score for the first media content block based on the first distance and a first probability that the first potential playback path is to be followed during a current playback session, wherein the first probability is based on a product of one or more local weights associated with the first potential playback path and a global weight that corresponds to a third probability that the first playback graph that includes the first potential playback path is to be followed during the current playback session;
compute a second distance along a second potential playback path between the current frame or a start frame of the second potential playback path and a second media content block;
compute a second score for the second media content block based on the second distance and a second probability that the second potential playback path is to be followed during the current playback session;
determine that the first media content block should be buffered based on the first score and the second score; and
cause the first media content block to be stored in the playback buffer for subsequent playback.

34. The system of claim 33, wherein the one or more processors are configured to cause the first media content block to be stored in the playback buffer by transmitting a request for the first media content block over a network.

35. The system of claim 33, wherein the one or more processors are configured to cause the first media content block to be stored in the playback buffer by transmitting the first media content block to the client device over a network.

* * * * *

UNITED STATES PATENT AND TRADEMARK OFFICE
CERTIFICATE OF CORRECTION

PATENT NO. : 11,770,565 B2
APPLICATION NO. : 17/466950
DATED : September 26, 2023
INVENTOR(S) : Mark Watson It is certified that error appears in the above-identified patent and that said Letters Patent is hereby corrected as shown below:

On the Title Page

Page 2 Column 1, in OTHER PUBLICATIONS,
(56) References Cited:
Please delete "Rishnamoorthi et al., "Quality-adaptive Prefetching for Interactive Branched Video using HTTP based Adaptive Streaming", Multimedia, ACM, XP058058715, DOI: 10.1145/2647868.2654951, ISBN: 978-1-4503-3063-3, Nov. 3-7, 2014, pp. 317-326." and insert --Krishnamoorthi et al., "Quality-adaptive Prefetching for Interactive Branched Video using HTTP based Adaptive Streaming", Multimedia, ACM, XP058058715, DOI: 10.1145/2647868.2654951, ISBN: 978-1-4503-3063-3, Nov. 3-7, 2014, pp. 317-326.--.

Signed and Sealed this
Twenty-eighth Day of November, 2023

Katherine Kelly Vidal
*Director of the United States Patent and Trademark Office*